Dec. 10, 1935.  C. A. ADAMS  2,023,718

ANTIFRICTION BEARING

Filed Oct. 10, 1930

INVENTOR
CHARLES A. ADAMS
By Paul, Paul & Moore
ATTORNEYS

Patented Dec. 10, 1935

2,023,718

UNITED STATES PATENT OFFICE 2,023,718

ANTIFRICTION BEARING

Charles Atwood Adams, Ellwood City, Pa., assignor to Mathews Conveyer Company, Ellwood City, Pa., a corporation of Pennsylvania Application October 10, 1930, Serial No. 487,692

6 Claims. (Cl. 308—187)

This invention relates to new and useful improvements in anti-friction bearings, generally, an object of the invention is to provide in such a bearing, means for positively preventing dust and foreign matter from entering the interior of the bearing and damaging the anti-friction elements and races in which they travel.

The object of the invention is to provide, an anti-friction bearing, comprising inner and outer race members, having anti-friction elements interposed therebetween, with means for rendering the bearing substantially dust-proof.

A further object is to provide a dust-proof anti-friction bearing applicable for use in connection with the rollers of a gravity conveyer whereby the latter may be used in such places as, for example, a foundry, where the air is usually laden with a fine dust of an abrasive nature which tends to get into the roller bearings.

Other objects of the invention will appear from the following description and accompanying drawing and will be pointed out in the annexed claims.

The invention consists generally in the construction and combinations hereafter described and pointed out in the claims.

The accompanying drawing discloses a structure designed to carry out the various objects of the invention, but it is to be understood that the invention is not confined to the exact features shown as various changes may be made within the scope of the claims which follow.

Figure 1:
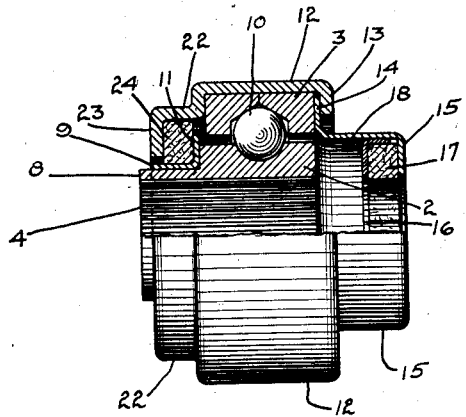
Figure 1 is a view illustrating my improved bearing, partially broken away to show the interior construction thereof.

The bearing featured in this invention comprises an inner race member 2 and an outer race member 3. The latter is shown constructed of two sections to permit assembling the usual anti-friction elements 10 between the race members. The inner race member is provided with a bore 4 adapted to receive an axle 5 non-rotatably supported in suitable members 6, usually of channel form. In the present instance, a portion of the periphery of the axle 5 is shown provided with longitudinally extending ridges 7 adapted to be engaged with correspondingly shaped ridges provided in the bore 4 of the inner race member, as shown in Figure 1. These ridges are adapted for interlocking engagement and prevent the inner race member from rotating upon the axle.

The inner race member is provided at its outer end with a lateral extension 8 having an annular member 9 securely fitted thereto by such means as a press fit so as to be non-rotatable. This member has a radial or outwardly turned flange 11 adapted to be seated against the end of the race member 2, as shown. To seal this end of the bearing, and to hold the two sections of the outer race member together, a jacket 12 is provided preferably formed of one piece of metal and snugly embracing the outer race member 3 and formed with a reduced cylindrical portion 22 having an inwardly turned flange 23, the inner edge of which terminates in relatively close proximity to the annular member 9, as shown in the drawing whereby there may be a radial play, more or less, between the inner edge of flange 23 and annular member 9. This flange 23 is spaced from the outwardly turned flange 11 of the member 9 so as to provide an annular recess adapted to receive a suitable sealing means or packing 24, as shown. By properly fitting the packing 24 between the reduced cylindrical portion 22 and the annular member 9, it becomes practically impossible for dust and foreign matter to enter the bearing, thereby rendering the bearing substantially dust-proof.

Figure 2:
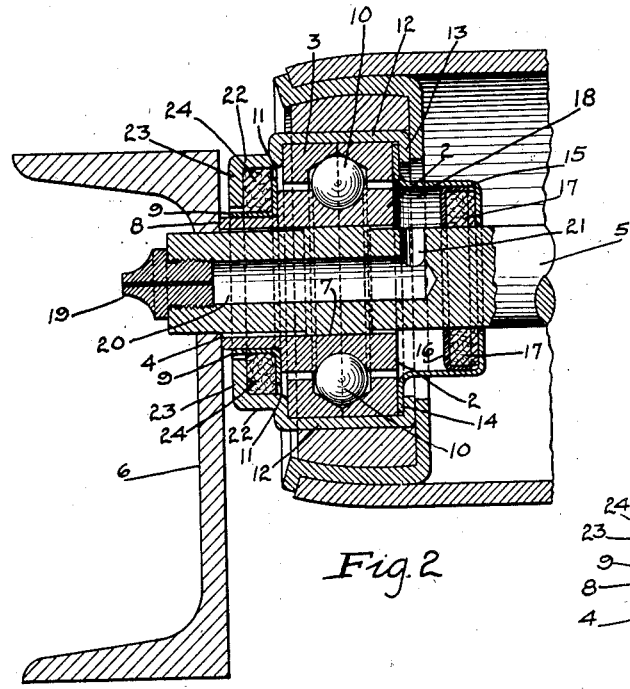
Figure 2 is a detail sectional view showing the bearing embodied in the construction of one end of a gravity roller.

The jacket 12 has an inwardly extending flange 13 at its opposite end adapted to be seated against the outwardly turned flange 14 of a member 15 cooperating with a relatively smaller member 16 to provide means for retaining a packing 17 in position against the axle 5, as best shown in Figure 2. The member 15 projects outwardly from the race members 2 and 3 to provide an annular chamber 18 into which a suitable lubricant may be introduced through a fitting 19, of ordinary well-known construction. This fitting communicates with the chamber 18 by means of a passage 20 and duct 21 in the axle 5.

The jacket 12 is preferably snugly fitted to the outer race member 3 so as to turn therewith and with the gravity conveyer roller 25 supported upon said bearing, when the bearing is used for supporting a roller of this character.

The novel bearing herein disclosed has been found particularly useful in such places as foundries, where the air is usually laden with dust which tends to work into the bearings. The sealing means provided at the outer end of the bearing is such as to positively prevent dust and grit from getting into the bearing and damaging the race members and the anti-friction elements thereof.

Figure 3:
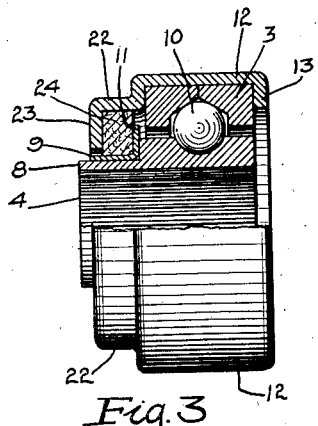
Figure 3 is a view showing a bearing provided with a packing at one end only.

Figure 3 illustrates the bearing shown in Figures 1 and 2, with the exception that the inner end of the bearing is not provided with a sealing means. In this instance, the flange 13 of the outer jacket 12 is seated directly against the end face of the outer race member 3.

In rotation of the outer race 3 and jacket 12 around the stationary inner race 2 the packing 24, carried by the jacket 12, will wipe the faces of annular member 9 and its flange 11, with which the packing contacts, so as to remove particles of foreign matter such as foundry sand and dust that may accumulate thereon and prevent it from being carried into the bearings, the annular member 9 and its flange 11 being practically non-rotatable. The radial play of the outer race and jacket relatively to the inner race, permitted by the space provided for between the inner edge of the inwardly turned flange 23 and annular member 9 prevents clogging and binding of the ball bearing races in the event of any scale separating or dislodging from the inside surface of the tubing used for gravity rollers, say of the type illustrated in Figure 2 of the drawing, as has been found to occur at times in actual practice. The play between the parts as mentioned, and as occasioned by the fact that the bearing is of the loose type, affords the opportunity for the particles of scale, or other foreign matter, to work their way out from between the races and thus efficiency of operation will be preserved.

The grease retaining seal at the inner end of the bearing, formed by the members 15 and 16 and the packing ring 17, is used only when the bearings are provided with a lubricating or greasing means and serves primarily the purpose of retaining the lubricant in the bearing. It is to be noted, however, that this seal also functions to prevent the intrusion of bits of scale from the inside of the tubing into the bearing races.

Having described my invention and set forth its merits, what I claim is:—

1. An anti-friction bearing comprising a substantially stationary inner race member and rotatable outer race member, and anti-friction elements between the race members, the inner race member having a longitudinal extension at one end, means embracing the outer race member and having a portion overhanging adjacent ends of the race members to form a sealing chamber between it and the ends of the race members to receive a seal, and having the lower edge of said overhanging portion spaced from the end extension of the inner race member to permit a limited radial play between it and the end extension of the inner race member, and a sealing member fitting in the sealing chamber to exclude foreign substance from the bearing.

2. An anti-friction bearing comprising a substantially stationary inner race member and rotatable outer race member, and anti-friction elements between the race members, the inner race member having a longitudinal extension at one end, means embracing the outer race member and having a portion overhanging adjacent ends of the race members to form a sealing chamber between it and the ends of the race members to receive a seal, a member of angular cross section non-rotatably mounted on a part of the inner race member with a portion thereof extending radially into the sealing chamber next to the ends of the race members, and a sealing member fitting in the sealing chamber and contacting with the radial extension of the angular shaped member to wipe the face thereof in rotation of the outer race member.

3. An anti-friction bearing comprising a substantially stationary inner race member and rotatable outer race member, and anti-friction elements between the race members, the inner race member having a longitudinal extension at one end, means embracing the outer race member and having a portion overhanging adjacent ends of the race members to form a sealing chamber between it and the ends of the race members to receive a seal, a member angular in cross section having a tubular portion and a part extending radially therefrom, non-rotatably mounted on the end extension of the inner race member and forming the bottom of the sealing chamber and its radial extension being disposed next to the adjacent ends of the race members, and a sealing member fitting in the sealing chamber for contact with the tubular and radial portions of the angular shaped member.

4. An anti-friction bearing comprising a substantially stationary inner race member and rotatable outer race member, and anti-friction elements between the race members, a member embracing the outer rotatable race member and having one end extended longitudinally of the axis of the bearing and then extended inwardly to form a chamber at one end of the two race members to receive a sealing member, and a cylindrical member disposed at the other end of the race members, said cylindrical member having at one end an outwardly disposed flange clamped to the end of the outer race member so as to rotate therewith and at its other end formed with an inwardly disposed flange, a cup-shaped member spaced from the inwardly disposed flange of said cylindrical member to receive a sealing member to be rotatable with the cylindrical member in its rotation with the outer race member.

5. An anti-friction bearing comprising an inner race and an outer race having anti-friction elements between them, one of said races being stationary and the other rotatable, a member secured to said outer race and extending inwardly toward said inner race and terminating short of said inner race to provide for limited radial play between said member and said inner race, a member of L-shape in cross-section having one leg thereof secured to said inner race and extending into the space between said inner race and said first mentioned member and having the other leg thereof extending radially outwardly towards said outer race and forming with said first mentioned member a sealing chamber, and a sealing member in said sealing chamber.

6. An anti-friction bearing comprising an inner race and an outer race having anti-friction elements between them, one of said races being stationary and the other rotatable, the inner race member having a longitudinal extension at one end, means embracing the outer race member and having a portion overhanging adjacent ends of the race members to form a sealing chamber between it and the ends of the race members to receive a seal, and having the lower edge of said overhanging portion spaced from the end extension of the inner race member to permit a limited radial play between it and the end extension of the inner race member, and a sealing member fitting in the sealing chamber to exclude foreign substance form the bearing.

CHARLES ATWOOD ADAMS.